United States Patent
Toczek et al.

(10) Patent No.: US 10,919,774 B2
(45) Date of Patent: Feb. 16, 2021

(54) METHOD FOR THE MANAGEMENT OF PHOSPHOGYPSUM

(71) Applicant: FERIN SP. Z O.O., Kedzierzyn Kozle (PL)

(72) Inventors: Agata Toczek, Kedzierzyn-Kozle (PL); Wlodzimierz Merka, Kedzierzyn-Kozle (PL); Patryk Gosciniak, Leszno (PL); Maciej Gosciniak, Dabcze (PL)

(73) Assignee: FERIN SP. Z O.O., Kedzierzyn-Kozle (PL)

( * ) Notice: Subject to any disclaimer, the term of this patent is extended or adjusted under 35 U.S.C. 154(b) by 0 days.

(21) Appl. No.: 16/603,901

(22) PCT Filed: Sep. 14, 2017

(86) PCT No.: PCT/PL2017/000085
§ 371 (c)(1),
(2) Date: Oct. 9, 2019

(87) PCT Pub. No.: WO2018/190737
PCT Pub. Date: Oct. 18, 2018

(65) Prior Publication Data
US 2020/0115249 A1    Apr. 16, 2020

(30) Foreign Application Priority Data
Apr. 14, 2017   (PL) .......................... 421318

(51) Int. Cl.
*C01C 1/24*       (2006.01)
*C01C 1/26*       (2006.01)
(Continued)

(52) U.S. Cl.
CPC .............. *C01C 1/24* (2013.01); *B01J 19/002* (2013.01); *B01J 19/0053* (2013.01); *B01J 19/10* (2013.01);
(Continued)

(58) Field of Classification Search
CPC ........... C01F 11/18; C01F 11/36; C01F 11/38; C01C 1/26; C01C 1/24; B01J 19/0053;
(Continued)

(56) References Cited

U.S. PATENT DOCUMENTS 10,370,258 B2 *  8/2019  Merka ................... C01B 25/324

FOREIGN PATENT DOCUMENTS

CN    108408751 A  *  8/2018  ............... C01C 1/24
EP      0495937         7/1992
(Continued)

OTHER PUBLICATIONS

PCT Search Report and Written Opinion prepared for PCT/PL2017/000085, completed Dec. 11, 2017.
(Continued)

*Primary Examiner* — Timothy C Vanoy
(74) *Attorney, Agent, or Firm* — Barnes & Thornburg LLP

(57) ABSTRACT

A method for the management of phosphogypsum consists in that a reactor (2) is charged with apatite and/or phosphorite phosphogypsum and with an aqueous or ammoniacal solution of ammonium carbonate and/or bicarbonate from a pre-reactor (1), at 1: (0.1-4) ratio of phosphogypsum to the aqueous or ammoniacal solution of ammonium carbonate and/or bicarbonate, the entire contents are stirred at −10° C. to 200° C. for at least 2 minutes, $CO_2$ being released in the course of the process is directed to the pre-reactor (1), and the post-reaction mixture is directed to a filter (3) to obtain an aqueous ammonium sulphate solution, whereas the precipitate from the filter (3) is heat-treated, followed by dissolving it in nitric acid in a reactor (5), and the resultant suspension is filtered through a filter (6) to obtain an aqueous calcium nitrate solution, and $CO_2$ being released in the reactor (5) is recirculated to the pre-reactor (1) wherein $CO_2$ (Continued)

is reacted with ammonia in an aqueous solution to obtain the aqueous or ammoniacal solution of carbonate and/or bicarbonate which is directed to the reactor (2), with the process for obtaining the aqueous or ammoniacal solution of ammonium carbonate and/or bicarbonate being conducted until the pH 7-12 of the solution is reached.

7 Claims, 1 Drawing Sheet

(51) Int. Cl.
 *C01F 11/36* (2006.01)
 *B01J 19/00* (2006.01)
 *B01J 19/10* (2006.01)
(52) U.S. Cl.
 CPC .............. *C01C 1/26* (2013.01); *C01F 11/36* (2013.01); *B01J 2219/00051* (2013.01)

(58) Field of Classification Search
 CPC .............. B01J 19/002; B01J 19/10; B01J 2219/00051; B01J 2219/00186
 See application file for complete search history.

(56) References Cited

FOREIGN PATENT DOCUMENTS

| RU | 2510366 | 3/2014 | | |
|---|---|---|---|---|
| RU | 2560802 | 8/2015 | | |
| RU | 2017 142 631 A | * | 4/2016 | ............ C05C 5/04 |

OTHER PUBLICATIONS

Podbiera-Matysik, Kinga, et al., "Potencial management of waste phosphogypsum with particular focus on recovery of rare earth metal," 2015, Polish Journal of Chemical Technology, vol. 17, No. 1, pp. 55-61.

* cited by examiner

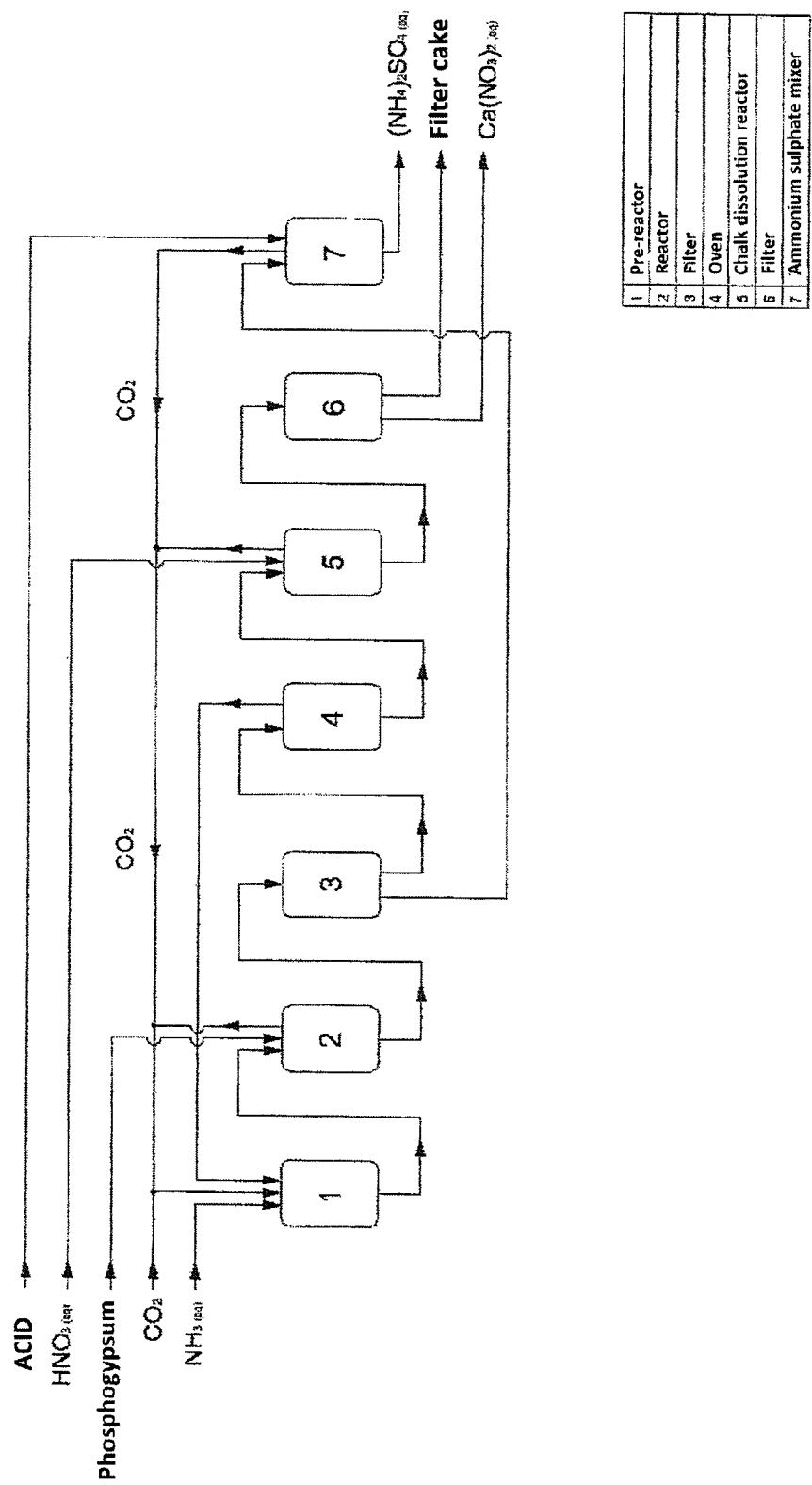

METHOD FOR THE MANAGEMENT OF PHOSPHOGYPSUM

CROSS-REFERENCE TO RELATED APPLICATIONS

This application is the U.S. national phase of PCT/PL2017/000085, filed on Sep. 14, 2017, which claims the benefit of Polish Patent Application Serial Number P.421318, filed on Apr. 14, 2017, the entire disclosures of both of which are incorporated herein by reference.

The invention relates to a method for the management of phosphogypsum, waste material from the production of phosphoric acid from phosphorites and apatites, utilized mainly in the chemical fertiliser industry.

The principal component of phosphogypsum is calcium sulphate formed in the reaction of sulphuric acid with phosphorites or apatites. The presence of compounds of such elements as phosphorus, fluorine, aluminium and others in phosphogypsum, as well as the presence of sulphuric acid and phosphoric acid in phosphogypsum limits the possibilities of utilizing phosphogypsum as a substitute for building gypsum. Phosphogypsum wastes are usually stored on dumping grounds or dumped in the sea.

PL 108676, PL 11028, PL 166137 and U.S. Pat. No. 2,640,757 disclose methods for the management of phosphogypsum directed to fertilisers.

Methods for the management of phosphogypsum are also claimed in the patents (Nos.) CN 101824536 and 101386909, as well as WO 2014148945 and RU 2471011.

The same method is disclosed in the patents DE 10230592, WO 2013/0606689, GB 310276 and US 2013/288887.

The Polish patent application No. P.412427 discloses a method for comprehensive utilization of phosphogypsum which comprises blending comminuted phosphogypsum with an aqueous solution of sulphuric acid. After separation, a precipitate is obtained which comprises mainly calcium sulphate and a liquid fraction; metals are precipitated from the liquid fraction, and the remaining calcium phosphate is an additive to phosphatic fertilisers. The separated precipitate of calcium sulphate is subjected to a conversion in the presence of ammonia water and carbon dioxide to obtain calcium carbonate and an ammonium sulphate solution used as a fertiliser. Calcium nitrate is obtained from calcium carbonate by means of nitric acid, and carbon dioxide released from this reaction is recirculated directly to the process of converting calcium sulphate to calcium carbonate.

The object of the invention was to work out an efficient, reproducible and cost-effective method for the management of phosphogypsum which would make it possible to reduce the amounts of this waste material directed to dumping grounds.

It has been found out that it is possible to conduct, in an efficient and reliable way, a method for the management of phosphogypsum in a metathesis reaction to obtain calcium carbonate and an aqueous solution of ammonium sulphate, if calcium sulphate contained in phosphogypsum is reacted with ammonium carbonate and ammonium bicarbonate solution obtained in a pre-reactor.

The essence of the method according to the invention consists in that a reactor 2 is charged with apatite and/or phosphorite phosphogypsum and with an aqueous or ammoniacal solution of ammonium carbonate and/or bicarbonate from a pre-reactor 1, at 1:(0.1-4) ratio of phosphogypsum to the aqueous or ammoniacal solution of ammonium carbonate and/or bicarbonate, the entire contents are stirred at −10° C. to 200° C. for at least 2 minutes, $CO_2$ being released in the course of the process is directed to the pre-reactor 1, and the post-reaction mixture is directed to a filter 3 to obtain an aqueous ammonium sulphate solution, whereas the precipitate from the filter 3 is heat-treated, followed by dissolving it in nitric acid in a reactor 5, and the resultant suspension is filtered through a filter 6 to obtain an aqueous calcium nitrate solution, and $CO_2$ being released in the reactor 5 is recirculated to the pre-reactor 1 wherein $CO_2$ is reacted with ammonia in an aqueous solution to obtain the aqueous or ammoniacal solution of carbonate and/or bicarbonate which is directed to the reactor 2, with the process for obtaining the aqueous or ammoniacal solution of ammonium carbonate and/or bicarbonate being conducted until the pH 7-12 of the solution is reached.

Preferably, the reactor 2 is charged with an aqueous or ammoniacal ammonium carbonate and/or bicarbonate solution of the total concentration of 10-50% by weight from the pre-reactor 1.

Preferably, the contents of the reactor 2 are sonicated for from 1 minute per every 10 minutes of the duration of the process to the continuous sonication.

Preferably, the precipitate from the filter 3 is heat-treated in an oven 4 at 40-800° C.

Preferably, residual gases from the heat treatment of the precipitate from the filter 3 are directed to the pre-reactor 1.

Preferably, the precipitate from the filter 3 after the heat treatment is mixed with an aqueous solution of calcium nitrate before being dissolved in the reactor 5.

Preferably, the filtrate from the filter 3 is directed to a mixer 7 wherein the pH value of the filtrate is adjusted to 3-7, whereas the residual $CO_2$ being released is introduced to the pre-reactor 1.

Preferably, the contents of the reactor 2 are stirred at 2-60° C.

Preferably, the contents of the reactor 2 are stirred for at least 30 minutes.

Preferably, the precipitate from the filter 3 is heat-treated in the oven 4 at 100-500° C.

The method according to the invention solves the problem of the solidification of the reaction suspension during the metathesis reaction, caused by too rapid crystallisation of ammonium carbonate and/or bicarbonate, which occurs during feeding gaseous carbon dioxide into a mixture of ammonia water and phosphogypsum in the methods known so far. The use of the pre-reactor eliminates the necessity of a direct application of $CO_2$ in the metathesis reaction, thus solving this problem. In the method according to the invention, a disadvantageous ternary gas-liquid-solid system has been eliminated in favour of a binary liquid-solid system during the metathesis reaction.

Due to the use of recirculation of the entire carbon dioxide from the reactor 2, 5 and the ammonium sulphate mixer 7 to the pre-reactor, the cost-effectiveness of the process has been increased; carbon dioxide is made up only in the case of a plant leakage and at the start-up of the plant.

The method according to the invention is carried out by means of a simple, inexpensive and easy-to-operate equipment.

The method according to the invention can be used to manage both apatite and phosphorite phosphogypsum.

EXAMPLES

The FIGURE shows schematically how to carry out the method according to the invention.

Example 1

The reactor 2 equipped with 200 W ultrasonic system is charged with 8 kg of ammonium carbonate and bicarbonate solution of the total concentration of 35% by weight from the pre-reactor 1 and with 8 kg of apatite phosphogypsum. The weight ratio of phosphogypsum to the ammonium carbonate and bicarbonate solution is 1 to 1. The contents are stirred vigorously using a high-speed turbine mixer. The metathesis process—the reaction of calcium sulphate contained in phosphogypsum with carbonates contained in the ammonium carbonate and bicarbonate solution to obtain calcium carbonate and an aqueous solution of ammonium sulphate, is carried out at room temperature. The temperature and pH of the reaction mixture are measured in a continuous manner. In the course of the reaction, the pH of the reaction mixture decreases from 9.8 to 8.7. The reaction is conducted for 2 hours. In the entire course of the process, ultrasound is switched on for 5 minutes and then switched off for 10 minutes. $CO_2$ forming in the course of the reaction of ammonium bicarbonate with calcium sulphate from phosphogypsum is directed to the pre-reactor 1. When the reaction has been completed, the mixture is directed to the filter 3.

The filtrate from the filter 3 containing the aqueous ammonium sulphate solution is directed to the ammonium sulphate mixer 7 wherein the pH value of the solution is adjusted to 4-6, and the residual $CO_2$ being released is introduced to the pre-reactor 1.

The aqueous ammonium sulphate solution contains:

| | |
|---|---|
| ammoniacal nitrogen | 9% by weight, |
| ammonium sulphate | 42% by weight, |
| sulphates | 28.3% by weight. |

Aqueous ammonium sulphate solution is a commercial product.

The precipitate from the filter 3 contains the produced calcium carbonate and small amounts of non-reacted phosphogypsum. The precipitate is subjected to a treatment aimed at obtaining an aqueous calcium nitrate solution used as a fertiliser.

According to the Regulation (EC) No. 2003/2003 on fertilisers, the ammoniacal nitrogen content in an aqueous calcium nitrate solution may not exceed 1% by weight. For this purpose, the residual amounts of water and ammonia are removed from the precipitate from filter 3 by a brief calcination of the obtained calcium carbonate precipitate for 5 minutes at 300° C. in the oven 4. Then, 7 kg of the precipitate after calcination is introduced to the chalk dissolution reactor 5. The dissolution is conducted with 55% nitric acid. 7.7 kg of the acid is introduced gradually over 1 hour while stirring the suspension vigorously with a high-speed gate stirrer. After introducing the whole amount of the acid, the reaction mixture is stirred vigorously for additional 1 hour. $CO_2$ forming in the course of the reaction is directed to the pre-reactor 1. The post-reaction mixture is separated using the filter 6.

The parameters of the obtained commercial aqueous calcium nitrate solution are as follows:

| | |
|---|---|
| nitrate nitrogen | 9.5% by weight, |
| ammoniacal nitrogen | <1% by weight, |
| calcium nitrate | 55.6% by weight, |
| free nitric acid | 0.01% by weight, |
| calcium expressed as CaO | 19% by weight, |
| pH | 4.9 |

Carbon dioxide being released in the apparatuses 1, 5, 7 is directed by bubbling to the bottom of the pre-reactor 1 packed with Bialecki rings. 25% ammonia water is fed periodically to the pre-reactor 1. The contents are stirred by closed circuit pumping. The internal temperature of the scrubber is kept below 35° C. by cooling the jacket with cold process water, if necessary. The pre-reaction is terminated at pH 10.1. The mixture of the ammonium carbonate and bicarbonate solution obtained in the pre-reactor 1 is directed to the reactor 2.

Example 2

The reactor 2, equipped with 100 W ultrasonic system is charged with 8 kg of ammonium carbonate and bicarbonate solution of the total concentration of 30% by weight from the pre-reactor 1 and with 9.6 kg of phosphorite phosphogypsum. The weight ratio of phosphogypsum to the ammonium carbonate and bicarbonate solution is 1 to 0.8. The contents are stirred vigorously using a high-speed turbine mixer. The metathesis process—the reaction of calcium sulphate contained in phosphogypsum with carbonates contained in the ammonium carbonate and bicarbonate solution to obtain calcium carbonate and an aqueous solution of ammonium sulphate, is conducted at 30° C. The temperature and pH of the reaction mixture are measured in a continuous manner. In the course of the reaction, the pH of the reaction mixture decreases from 9.6 to 8.8. The reaction is conducted for 3 hours. In the entire course of the process, ultrasound is switched on for 10 minutes and then switched off for 10 minutes. $CO_2$ forming in the course of the reaction of ammonium bicarbonate with calcium sulphate from phosphogypsum is directed to the pre-reactor 1. When the reaction has been completed, the mixture is directed to the filter 3.

The filtrate from the filter 3 containing the aqueous ammonium sulphate solution is directed to the ammonium sulphate mixer 7 wherein the pH value of the solution is adjusted to 4-6, and the residual $CO_2$ being released is introduced to the pre-reactor 1.

The aqueous ammonium sulphate solution contains:

| | |
|---|---|
| ammoniacal nitrogen | 8.5% by weight, |
| ammonium sulphate | 40% by weight, |
| sulphates | 27% by weight. |

Aqueous ammonium sulphate solution is a commercial product.

The precipitate from the filter 3 contains the produced calcium carbonate and small amounts of non-reacted phosphogypsum. The precipitate is subjected to a treatment aimed at obtaining an aqueous calcium nitrate solution used as a fertiliser.

According to the Regulation (EC) No. 2003/2003 on fertilisers, the ammoniacal nitrogen content in an aqueous calcium nitrate solution may not exceed 1% by weight, thus the residual amounts of water and ammonia are removed from the precipitate from the filter 3 by a brief calcination of the obtained calcium carbonate precipitate for 7 minutes at 200° C. in the oven 4. Then, 8.3 kg of the precipitate after calcination is introduced to the chalk dissolution reactor 5.

The dissolution is conducted with 45% nitric acid. 8.5 kg of the acid is introduced gradually over 1.5 hours while stirring the suspension vigorously with a high-speed gate stirrer. After introducing the whole amount of the acid, the reaction mixture is stirred vigorously for additional 30 minutes. $CO_2$ forming in the course of the reaction is directed to the pre-reactor 1. The post-reaction mixture is separated using the filter 6.

The parameters of the obtained commercial aqueous calcium nitrate solution are as follows:

| | |
|---|---|
| nitrate nitrogen | 8.5% by weight, |
| ammoniacal nitrogen | <1% by weight, |
| calcium nitrate | 50% by weight, |
| free nitric acid | 0.01% by weight |
| calcium expressed as CaO | 17.1% by weight, |
| pH | 5.2 |

Carbon dioxide being released in the apparatuses 1, 5, 7 is directed by bubbling to the bottom of the pre-reactor 1 equipped with a gate stirrer. 23% ammonia water is fed periodically to the pre-reactor 1. The contents are stirred. The internal temperature of the pre-reactor 1 is kept below 35° C. by cooling the jacket with cold process water, if necessary. The pre-reaction is terminated at pH 10. The mixture of the ammonium carbonate and bicarbonate solution obtained in the pre-reactor 1 is directed to the reactor 2.

Example 3

The reactor 2 equipped with 300 W ultrasonic system is charged with 9.6 kg of ammonium carbonate and bicarbonate solution of the total concentration of 25% by weight from the pre-reactor 1, and with 4 kg of apatite phosphogypsum and 4 kg of phosphorite phosphogypsum. The weight ratio of phosphogypsum to the ammonium carbonate and bicarbonate solution is 1 to 1.2. The contents are stirred vigorously using a high-speed turbine mixer.

The metathesis process—the reaction of calcium sulphate contained in phosphogypsum with carbonates contained in the ammonium carbonate and bicarbonate solution to obtain calcium carbonate and an aqueous solution of ammonium sulphate is conducted at 35° C. The temperature and pH of the reaction mixture are measured in a continuous manner. In the course of the reaction, the pH of the reaction mixture decreases from 9.7 to 8.6. The reaction is conducted for 1 hour. In the entire course of the process, ultrasound is switched on. $CO_2$ forming in the course of the reaction of ammonium bicarbonate with calcium sulphate from phosphogypsum is directed to the pre-reactor 1. When the reaction has been completed, the mixture is directed to the filter 3.

The filtrate from the filter 3 containing the aqueous ammonium sulphate solution is directed to the ammonium sulphate mixer 7 wherein the pH value of the solution is adjusted to 4-6, and the residual $CO_2$ being released is introduced to the pre-reactor 1.

The aqueous ammonium sulphate solution contains:

| | |
|---|---|
| ammoniacal nitrogen | 8.1% by weight, |
| ammonium sulphate | 38.1% by weight, |
| sulphates | 25.7% by weight. |

Aqueous ammonium sulphate solution is a commercial product.

The precipitate from the filter 3 contains the produced calcium carbonate and small amounts of non-reacted phosphogypsum. The precipitate is subjected to a treatment aimed at obtaining an aqueous calcium nitrate solution used as a fertiliser.

According to the Regulation (EC) No. 2003/2003 on fertilisers, the ammoniacal nitrogen content in an aqueous calcium nitrate solution may not exceed 1% by weight, thus the residual amounts of water and ammonia are removed from the precipitate from the filter 3 by a brief calcination of the obtained calcium carbonate precipitate for 2 minutes at 350° C. in the oven 4. Then, 6.8 kg of the precipitate after calcination are mixed with 4 kg of the aqueous calcium nitrate solution obtained as in the Example 2 to prepare a suspension, which is introduced to the chalk dissolution reactor 5. The dissolution is conducted with 50% nitric acid. 7.2 kg of the acid is introduced gradually over 45 minutes while stirring the suspension vigorously with a high-speed gate stirrer. After introducing the whole amount of the acid, the reaction mixture is stirred vigorously for additional 30 minutes. $CO_2$ forming in the course of the reaction is directed to the pre-reactor 1. Post-reaction mixture is separated using the filter 6.

The parameters of the obtained commercial aqueous calcium nitrate solution are as follows:

| | |
|---|---|
| nitrate nitrogen | 8.2% by weight, |
| ammoniacal nitrogen | <1% by weight, |
| calcium nitrate | 48% by weight, |
| free nitric acid | 0.02% by weight, |
| calcium expressed as CaO | 16.4% by weight, |
| pH | 5.0 |

Carbon dioxide being released in the apparatuses 1, 5, 7 is directed by bubbling to the bottom of the pre-reactor 1 packed with Bialecki rings. 20% ammonia water is fed periodically to the pre-reactor 1. The contents are stirred by closed circuit pumping. The internal temperature of the scrubber is kept below 35° C. by cooling the jacket with cold process water, if necessary. The pre-reaction is terminated at pH 9.9. The mixture of the ammonium carbonate and bicarbonate solution obtained in the pre-reactor 1 is directed to the reactor 2.

The invention claimed is:

1. A method for the management of phosphogypsum, characterized in that a reactor is charged with apatite and/or phosphorite phosphogypsum and with an aqueous or ammoniacal solution of ammonium carbonate and/or bicarbonate from a pre-reactor, at 1:(0.1-4) ratio of phosphogypsum to the aqueous or ammoniacal solution of ammonium carbonate and/or bicarbonate, the entire contents are stirred at −10° C. to 200° C. for at least 2 minutes, $CO_2$ being released in the course of the process is directed to the pre-reactor, and the post-reaction mixture is directed to a filter to obtain an aqueous ammonium sulphate solution, whereas the precipitate from the filter is heat-treated, followed by dissolving it in nitric acid in a reactor, and the resultant suspension is filtered through a filter to obtain an aqueous calcium nitrate solution, and $CO_2$ being released in the reactor is recirculated to the pre-reactor wherein $CO_2$ is reacted with ammonia in an aqueous solution to obtain the aqueous or ammoniacal solution of carbonate and/or bicarbonate which is directed to the reactor, with the process for obtaining the aqueous or ammoniacal solution of ammonium carbonate and/or bicarbonate being conducted until the pH 7-12 of the solution is reached.

2. The method according to claim 1, characterized in that the reactor is charged with an aqueous or ammoniacal ammonium carbonate and/or bicarbonate solution of the total concentration of 10-50% by weight from the pre-reactor.

3. The method according to claim 1, characterized in that the contents of the reactor are sonicated for from 1 minute per every 10 minutes of the duration of the process to the continuous sonication.

4. The method according to claim 1, characterized in that the precipitate from the filter is heat-treated in an oven at 40-800° C.

5. The method according to claim 1, characterized in that residual gases from the heat treatment of the precipitate from the filter are directed to the pre-reactor.

6. The method according to claim 1, characterized in that the precipitate from the filter after the heat treatment is mixed with an aqueous solution of calcium nitrate before being dissolved in the reactor.

7. The method according to claim 1, characterized in that the filtrate from the filter is directed to a mixer wherein the pH value of the filtrate is adjusted to 3-7, whereas the residual $CO_2$ being released is introduced to the pre-reactor.

* * * * *